United States Patent [19]

Gagneraud

[11] 4,300,985
[45] Nov. 17, 1981

[54] PROCESS OF THERMAL DECOMPOSITION OF RUBBER MATERIALS

[76] Inventor: Francis Gagneraud, Villa Montmorency, 6, Avenue des Tilleuls, 75016 Paris, France

[21] Appl. No.: 123,180

[22] Filed: Feb. 20, 1980

[30] Foreign Application Priority Data

Feb. 21, 1979 [FR] France ................................ 79 04343

[51] Int. Cl.$^3$ .................. C04B 7/14; C10B 49/14; C10B 57/00
[52] U.S. Cl. ........................................ 201/10; 48/209; 75/24; 106/117; 110/346; 201/25
[58] Field of Search ........................... 201/2.5, 10, 25; 48/209; 75/24, 88; 106/309, 288 B, 288 US, 117; 423/449; 110/346

[56] References Cited

U.S. PATENT DOCUMENTS 2,647,045  7/1953  Rummel ................................ 48/206
4,062,672 12/1977  Kunicki .
4,165,233  8/1979  Gagneraud .
4,175,949 11/1979  Breznay ................................. 75/42

FOREIGN PATENT DOCUMENTS 168070  9/1956  Australia ................................ 48/92
52-10450  3/1977  Japan ..................................... 201/10

OTHER PUBLICATIONS

"Blast Furnace", *How Things Work*, vol. II, pp. 32-33, Edits-Service, S. A., Geneva.

*Primary Examiner*—Bradley Garris
*Attorney, Agent, or Firm*—Browdy and Neimark

[57] ABSTRACT

Rubber-base wastes, such as tires and industrial rubber wastes, may be disposed of, without pretreatment thereof, by contacting the wastes with molten metallurgical slag on the site of the production of the slag. The molten slag causes flash thermal decomposition of the rubber-base wastes in a non-polluting manner. The solidified slag products obtained are useful for soil improvement or construction work consolidation.

6 Claims, No Drawings

PROCESS OF THERMAL DECOMPOSITION OF RUBBER MATERIALS

FIELD OF THE INVENTION

This invention relates to the field of disposal and profitable use of wastes, essentially of rubber-base materials. It relates more particularly to a thermal treatment process intended to decompose rubber-base wastes, such as used tires or similar articles, and possibly recover products resulting from the decomposition.

BACKGROUND OF THE INVENTION

It is known that rubber-base products, such as industrial wastes, and more particularly, tires, represent increasingly large storage volumes and cause serious problems of disposal and profitable use.

Actually, destruction by self-burning in the open air is extremely polluting because of the release of carbon black from the imperfect combustion of hydrocarbons that make up natural and synthetic rubbers. When specialized combustion installations are used, the costs are high because of the high cost of shredding and combustion apparatus.

For a number of years attempts have been made to make profitable use of these wastes in various ways; for example, shredding and grinding to obtain powder products that can be recycled in rubber manufacture or used in soil coverings, or again solubilizing and dissolving in hydrocarbon solvents with further regeneration of the rubber or adhesive products. Another technique, considered as reasonable and, a priori, promising for the future, consists in performing incineration and pyrolysis of the wastes to be able to recover the valuable materials such as carbon black, oils and gaseous products. However, these complex processes of pyrolysis at 500 to 1,000° C. and often under high pressures (for example, 100 bars) are not now developed on an industrial scale, because the recovered products have a lower market value than the treatment cost.

SUMMARY OF THE INVENTION

One of the purposes of the present invention is to propose a simple and effective process, not requiring high investment in installations and not causing pollution, to destroy rubber wastes of all types.

Another purpose is to make profitable use of these wastes and of the products obtained in the process of the invention and which often are also considered as cumbersome materials.

According to the main characteristic of the present invention, a flash heat treatment at high temperature is performed on the rubber materials by putting them in contact with molten metallurgical slags on the very production site of the slags.

DETAILED DESCRIPTION OF PREFERRED EMBODIMENTS

It has actually been found in a surprising way that simple contact, without preliminary preparation or use of special devices, between the molten slags and rubber wastes or worn products results in an extremely fast combustion of these latter and without the formation of fumes or other polluting products.

The term slag used here also includes scoria and relates more particularly to molten metallurgical slags whose melting temperatures generally vary from 1,250° to 1,700° C., depending on the origins and chemical composition. For example, foundry slags have lower temperatures, on the order of 1,250° to 1,400° C., while slags from ferrochromium electrometallurgy have melting temperatures that can reach 1,700° C.

It has further been found that, particularly as a result of the formation of gaseous light hydrocarbons coming from cracking of the rubber polymer chains and release of combustion gas, the slags used as flash heat treating agent can solidify under two aspects, namely:

in alveolar form, because of the presence of gas bubbles trapped in the material during cooling. There is thus obtained an expanded material, exhibiting a high friability and easily crumbling and requiring only slight grinding for further uses; or in compact form, because of the absence of gas bubbles that escaped thanks to a sufficient fluidity of the molten slag. In this case there are obtained large-sized perfectly stabilized blocks, in which the metal tire carcasses are buried, which increases the cohesion of the blocks.

However, certain rules have to be followed for full effectiveness of the process:

The rubber product mass/molten slag or scoria mass ratio should not exceed a certain value, because the energy input must be sufficient to cause complete cracking of the hydrocarbons. If this energy input is insufficient, the formation of black smoke coming from the incomplete combustion of the hydrocarbons will be observed.

Molten slags or scoria should be used that have a certain margin between their real temperature and the solidification temperature, because this energy difference makes it possible to obtain cracking of the polymer chains, which is an endothermic reaction.

Depending on the energy excess, two aspects of cooled slag are obtained. For the same rubber residue/molten slag ratio it is possible to obtain a final alveolar material, if the slag has a temperature close to the solidification temperature, or have a compact material, if the slag is particularly hot, which makes possible a perfect evacuation of the gas bubbles. One can also achieve a material exhibiting a compact aspect at the bottom and alveolar on the surface, if the slag is at an intermediate temperature.

It has been found by experience that the ratio by weight of rubber/liquid slag, for the operation to take place without release of black smoke, is on the order of 5 to 15%, depending on the energy excess exhibited by the slag above its solidification temperature.

In practice, the treatment according to the present invention can be directed, depending on whether there is envisaged the simple destruction of rubber wastes to avoid storage or dumping or it is desired to recover decomposition products at high temperature.

According to a first embodiment, corresponding to open-air destruction, the wastes can be stored in a basin or pit near the metallurgical plant and the liquid slag or scoria poured on the wastes that have been previously weighted or attached to the bottom of the pit.

According to another embodiment, the treatment can be performed in a suitable container in which are placed the the rubber wastes, held in place by a grill resistant to high temperatures, this container being able to act as a mold for the solidified material after cooling.

Under effect of the very high temperature, the macromolecular chains making up the elastomer (particularly conjugated diene polymers or copolymers) split into hydrocarbons of less molecular mass, which are released in the gaseous state, since they ignite and burn with a clean flame without formation of carbon black and with production of $CO_2$ and water vapor. The carbon black, generally used as a charge in rubber articles, also oxidizes into $CO_2$. The other charges and/or dyes, as for example ZnO, yield ashes the dissolve in the molten slag. The sulfur, corresponding to the rubber vulcanizing sulfur agents, is essentially transformed into $SO_2$ and combines easily with the treatment medium, since the metallurgical slags generally have an excess of base elements, as is particularly the case for steel mill slags. In any case, $SO_2$ is not detected in the atmosphere close to the treatment site, the sulfur remaining trapped in the slag, essentially in the form of calcium sulfate.

Destruction of the rubber wastes without formation of harmful elements in the atmosphere can be explained as follows: decomposition of the rubber being very fast, the hydrocarbons formed are immediately brought to high temperature and create a large volume of gas that comes in contact with sufficient air for their complete oxidation. Further, the molten slag constitutes a trap for the charges of the rubber material; this latter therefore prevents the less volatile constituents of these charges from leaving and is enriched with sulfur and ZnO or other metallic oxides.

According to another embodiment of the present invention, when the recovery of the decomposition products is contemplated, the heat treatment is performed in a container such as that mentioned above, placed in a closed enclosure comprising a system for recovery of the gases and vapors that are released above the container.

This treatment in a non-oxidizing medium notably modifies the process of destruction of the rubber wastes. Actually, because of the sensible heat of the molten slag, the rubber polymers are dissociated into their starting monomers (isoprene, butadiene, etc), that are then split into shorter molecules, such as $H_2$, $CH_4$, $C_2H_6$, etc. which are then recovered in a trap installation. The carbon black, in this non-oxidizing medium, can be gasified into CO only if the slag contains metal oxides capable of being reduced, as for example iron or manganese oxides. In this case, the steel mill slags containing a notable amount of said oxides are advantageously used as the heat treatment medium. Carbon monoxide, CO, joins with other gaseous hydrocarbons and is simultaneously recovered with them. Sulfur has the same behavior as during open-air treatment and combines with the calcium ions of the molten slag or scoria. The ZnO, which is reducible by carbon starting at 600° C, can be found in part in the gas in the form of zinc vapor, whose vaporization temperature is close to 918° C.

In the second variant embodiment of the process with recovery of the decomposition products, the recovery system should essentially comprise: devices for the condensation of zinc vapors and hydrocarbons (normally liquid at regular temperature) and a system for washing the recovered gases intended to be used later alone or in mixture.

Whatever the embodiment of the process according to the two above variations, there is obtained at the end of the treatment, as indicated above, a metallurgical slag either compact or at least partially spongy and friable, easily freeing the metal wires that come, for example, for certain radial tire carcasses, these metal products being able to be recovered by simple screening or by magnetic separation, as applicable.

These expanded metallurgical slags and scoria that are recovered after treatment constitute interesting products that can be profitably used and which require only a slight later grinding. For example, they are particularly suited as soil improvement agents, contributing the following properties in particular: increase of the pH, lightening of the soil, increase of the water absorption power of the soil, input of trace elements, for example zinc, coming from the charges of the rubber wastes.

In case there are obtained compact blocks containing metal carcasses, the latter can advantageously be used as strengthening or fill material for construction, for example, of embankments or similar works.

EXAMPLES OF EMBODIMENT

Lots made up of used tires (from private cars and road equipment) with a total mass from 700 to 1,000 kg were put in a bottomless container (of the slag shaft type) with a truncated conical shape, the smallest upward section being closed with a large-section bar grill. The main purpose of this grill is to keep on the inside of the container the tires, which are subjected to Archimedean thrust when the molten slag is poured in.

The container filled with tires was placed in the pit under the point for pouring the slag, which was brought in 15 to 25 ton ladles. The molten slag, whose temperature was about 1,500° C. was poured as steadily as possible to assure a progressive, continuous cracking of the rubber making up the tires. Too rapid pouring of the molten slag would cause too sudden release of the rubber decomposition gases, which would lead to foaming and intense overflow of the slag from the container and the formation of a high gas-combustion flame.

The end of the destruction is marked by the diminution, then disappearance of the combustion flame; then pouring of the molten slag is stopped and sufficient cooling time is allowed before removing the solidified material from the container.

This solidified material generally had two aspects:

the upper part was expanded and very easy to crumble, like that obtained during treatment of slags with phosphorus products (see, for example, U.S. Pat. Nos. 4,062,672 and 4,165,233), the lower part formed a compact, single-piece plug of great size and very resistant to impact and pressure.

Thus, by using steel mill slag in 15 ton ladles, it is possible to treat, according to this technique, at least 700 kg of tires per operation. On the site of a plant having 150,000 tons of steel slag per year, it is then possible to destroy at a minimum 7,000 tons/year of rubber wastes. Further, it is obviously possible to use a slag other than steel mill slag, for example, blast furnace or electric furnace slag, provided, of course, that this slag is hot enough.

The process of the present invention can be applied to the destruction and/or profitable use of all rubber materials, as for example: tires from automobiles, trucks, aircraft, road equipment, etc.; industrial rubber wastes, such as for example, conveyor belts or other products, whether rolled or cut in sections; and in a general way, to all non-recyclable rubber objects.

It will be obvious to those skilled in the art, that various changes may be made without departing from the scope of the invention, and the invention is not to be limited to what is described in the specification.

What is claimed is:

1. A process of disposal of rubber-base wastes by flash thermal decomposition at high temperatures, comprising pouring molten metallurgical waste slag at a temperature above 1,250° C., which slag has been removed from a metallurgical furnace, onto the rubber-base wastes at the production site of said slag, the weight ratio of the rubber-base waste/molten slag being between 5 and 15%.

2. A process in accordance with claim 1, wherein prior to said pouring step the rubber-base wastes are stacked in an open-air pit in the vicinity of a metallurgical plant and weighted down or attached to the bottom of the pit, and said pouring step comprises pouring the slag directly thereonto.

3. A process in accordance with claim 1, wherein said pouring step comprises pouring the molten waste slag onto the rubber-base wastes in a basin or closed container, equipped with a system for recovery of the gases and vapors, and then condensing, washing and recovering the gases and vapors.

4. A process in accordance with one of claims 1 to 3, wherein during said pouring step the temperature of the molten metallurgical slag is sufficiently close to the solidification temperature thereof to entrap gas and vapor formed by decomposition of said rubber-base wastes in the solidified slag and thereby produce an alveolar solid material.

5. A process in accordance with claim 4, further including the step of subjecting said alveolar material produced by said pouring step to screening or magnetic separation to eliminate metal reinforcement materials therefrom.

6. A process in accordance with one of the claims 1 to 3, wherein the temperature of the molten metallurgical slag is sufficiently higher than the solidification temperature thereof to permit complete evacuation of gas and vapors formed during decomposition prior to solidification, thereby permitting the formation of a compact solid slag material.

* * * * *